April 30, 1957     E. C. AYRES     2,790,307
STORAGE OF VOLATILE LIQUIDS
Filed Sept. 12, 1955
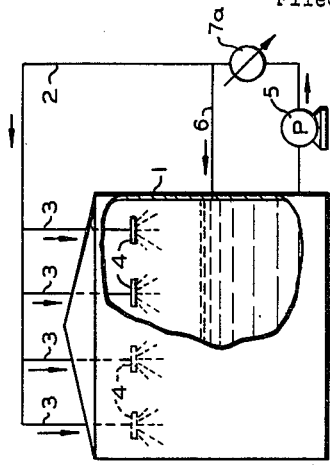
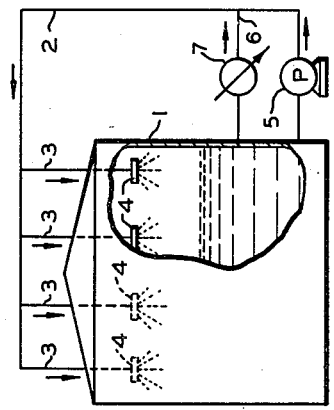
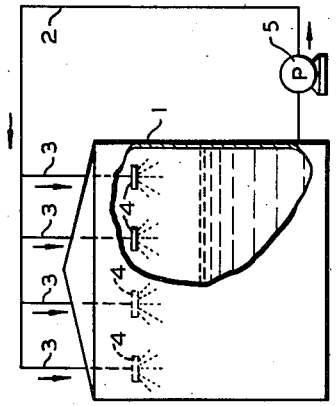
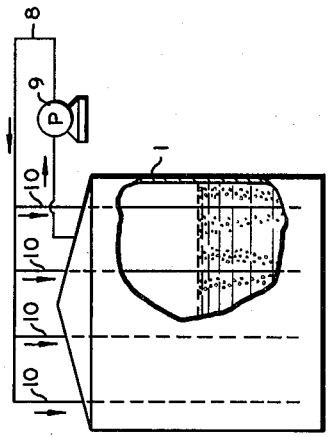
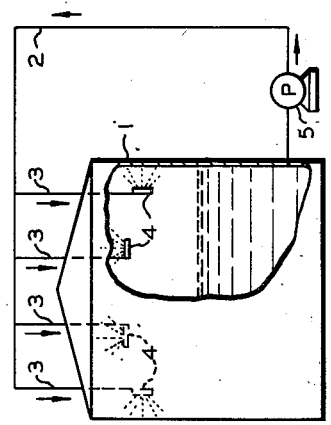
*INVENTOR.*
E. C. AYRES
BY
*ATTORNEYS*

United States Patent Office 2,790,307
Patented Apr. 30, 1957

2,790,307

STORAGE OF VOLATILE LIQUIDS

Elwyn C. Ayres, Bartlesville, Okla., assignor to Phillips Petroleum Company, a corporation of Delaware Application September 12, 1955, Serial No. 533,840

7 Claims. (Cl. 62—1)

This invention relates to the storage of volatile liquids. In one aspect the invention relates to control of the maximum pressure within a vessel containing liquid and vapor, when the bottom portion of the liquid is cooler than the surface of the liquid, by a method comprising utilizing the heat adsorption capacity of the cooler liquid to cool the warmer vapors by direct heat exchange, the amount of cooling so effected being regulated so as to maintain the pressure within the vessel below a predetermined value. In another aspect the invention relates to minimizing or eliminating vapor losses from volatile liquids stored in vessels, utilizing the heat absorbing capacity of cool liquid stored in the vessel to cool warmer vapors stored over the liquid by direct heat exchange between the cool liquid and the warm vapor. In still another aspect the invention relates to minimizing the drop in vapor pressure in vessels containing stored liquids during cool periods by contacting vapors and liquid during such periods.

In the storage of volatile liquids such as, for example, crude oil, various refined petroleum products, aqua ammonia, etc., in large metal tanks or other vessels located above ground, large losses of vapors from such stored liquids normally occur because of the breathing action of the tanks. Such tanks are usually able to stand only small external or internal pressure differentials because of their large size. In the usual operation the tanks and the liquid therein have cooled during the night. When the tank and its contents cool, air is allowed to enter through a vent valve so that the vacuum in the vessel is relieved to prevent collapse of the vessel. During a warm day ambient temperatures and the sun's rays heat the vapors in the vapor space of the tank, and in order to relieve internal pressures, vapors must be vented from the tank through a breathing or vent valve.

It has been found that, although during such warm days the top of the liquid stored in the tank is also warmed to a considerable extent, the liquid near the bottom of the tank will remain considerably cooler, because in such large tanks thermal equilibrium is seldom reached since ambient temperatures do not remain constant for sufficient time.

It is an object of the invention to provide a method for maintaining the pressure in a storage vessel containing a volatile liquid which is cooler near the bottom than on its surface below a predetermined value. It is another object of the invention to provide a process for minimizing vapor losses from a vessel containing a volatile liquid which is cooler near the bottom than on its surface, utilizing the heat absorbing capacity of the cooler liquid in the bottom to absorb heat from such vapors. It is a still further object to effect cooling of such vapors by direct contact with such cooler liquid which is being stored in the tank. It is another object to effect such direct contact entirely within said tank. It is a still further object to minimize the lowering of the pressure in the vapor space of a vessel containing stored liquids during periods of cool ambient temperatures.

Other objects, as well as aspects and advantages of the invention, are apparent from the disclosure, the drawings, and the appended claims.

According to the invention, there is provided a method for cooling vapors present in a storage vessel containing liquid, which liquid is cooler near the bottom than on its surface, which method comprises contacting such vapors with at least a portion of the said cooler liquid.

Also according to the invention, there is provided a method for cooling vapors present in a storage vessel containing liquid, which liquid is cooler near the bottom than on its surface, which method comprises contacting such vapors with at least a portion of said cooler liquid, said contacting being effected entirely within said vessel.

Further, according to the invention, there is provided a method for controlling the maximum pressure in a vessel containing stored liquid and vapors, which liquid is cooler near the bottom than on its surface, which comprises contacting such vapors with at least a portion of said cooler liquid, thereby cooling said vapors and thus reducing the pressure in the vessel, the amount of said cooling effected being dependent upon the pressure in the vessel and being effective to maintain said pressure below a predetermined value.

Further, according to the invention, there is provided a method for controlling the maximum pressure in a storage vessel containing liquid and vapors, which liquid is cooler near the bottom than on its surface, which comprises contacting such vapors with a portion of said cooler liquid and contacting the surface of said liquid with another portion of said cooler liquid, thereby cooling said vapors and cooling the surface of said liquid, thus reducing the pressure, the amount of said cooling being dependent upon the pressure in the vessel and being effective to maintain said pressure below a predetermined value.

Also, according to the invention, there is provided a method for controlling the maximum pressure in a storage vessel containing liquid and vapors, which liquid is cooler near the bottom than on its surface, which method comprises contacting such vapors and also contacting the inside of the roof and upper side walls of said vessel with at least a portion of said cooler liquid, the amount of said cooling being dependent upon the pressure in the vessel and being effective to maintain said pressure below a predetermined value.

Further, according to the invention there is provided a method for cooling vapors present in a storage vessel during periods of net heat input from outside the vessel and for heating said vapors during periods of net heat loss from said vessel to its surroundings, which method comprises contacting such vapors with at least a portion of said liquid during said periods of net heat input and during said periods of net heat loss.

Also, according to the invention, there is provided a method for heating vapors in a vessel containing liquid, during periods of net heat loss from said vessel to its surroundings, which method comprises contacting such vapors with at least a portion of said liquid during said periods of net heat loss.

Further, according to the invention, there is provided a method for controlling a maximum pressure in the vessel containing stored liquid and vapors during periods of net heat input from outside the vessel and for controlling the minimum pressure in a vessel containing stored liquid and vapors during periods of net heat loss from said vessel to its surroundings, which method comprises contacting said vapors with at least a portion of said liquid during periods of said net heat input, thereby cooling said vapors and thus reducing pressure in the vessel, the amount of cooling effected being dependent upon the pressure in the vessel and being effective to maintain said pressure below a predetermined maximum value; and contacting such vapor with at least a portion of said liquid, during said periods of net heat loss, thereby warming said vapors and thus minimizing pressure reduction in said vessel, the amount of said heating effected being dependent upon the pressure in the vessel and being effective to maintain said pressure above a predetermined minimum value.

Figures 1, 2, 3, 4, and 5 each illustrate diagrammatically an embodiment or variation of the method of the invention. Valves, control means, level gauges, etc., which may ordinarily be employed in the operation of a typical liquid storage installation are not shown. Also, as mentioned hereinbefore, each storage vessel has a breathing or a vent valve in a typical installation. However, the invention is applicable to such a storage tank and system having no vent or breathing valve; thus, tanks can be constructed which will withstand a moderate pressure and a moderate vacuum, and in such case the function of the process of the invention is to maintain the pressure and vacuum within the safe limits for the vessel involved, and to prevent the pressure from exceeding a predetermined maximum.

In Figures 1, 2, 3, 4, and 5 like numbers have like numerical designations.

In Figure 1, 1 is a closed vessel containing a volatile liquid. Conduit 2 communicates with vessel 1 near the bottom and branches into a plurality of lines 3 which communicate with spray means 4 in the vapor space of tank 1. Pumping means 5 is provided in conduit 2. In operation, cool liquid from the bottom of vessel 1 is conducted through lines 2, 3, and spray means 4 by means of pumping means 5. Cool oil sprayed in a generally downward direction in the top of vessel 1 contacts and cools warmer vapors contained therein. This contacting can be effected by employing a small continuous flow throughout warm periods or by employing somewhat larger intermittent flows throughout the same warm period. The rate of continuous pumping, or the length of time and/or frequency of intermittent pumping period can be controlled by hand, or automatically in response to pressure variation within said vessel, as will be readily understood.

In Figures 2 and 3 the description and operation is the same as described with regard to Figure 1 except that each has a branch line 6 communicating between conduit 2 and vessel 1, and Figure 2 contains indirect cooling means 7 in line 6, while Figure 3 contains indirect cooling means 7a in line 2. In the operation of each of Figures 2 and 3, in one embodiment, cooling means 7 and 7a respectively, are not operated, i. e., no cooling is effected. In such operation, then, of the process diagrammatically illustrated in these figures, a side stream of the cooler liquid from the bottom of vessel 1 is injected at or near the surface of the liquid in the vessel. This, as will be understood, cools the surface of the liquid and thus reduces its vapor pressure, and thus aids in reducing the pressure in vessel 1. Alternately, in Figure 2, cooling means 7 can be employed to further lower the temperature of the stream flowing in line 6. So also, in Figure 3 cooler 7a can be operated to further lower the temperature of the entire stream flowing in line 2.

In Figure 4 the description and operation is the same as described in connection with Figure 1, except that the sprays are directed generally toward the walls and roof of vessel 1, thus serving not only to cool vapors in the top of vessel 1 by direct contact but also to cool the upper walls and roof of vessel 1.

In Figure 5, conduit 8 communicates with vapors in the upper portion of vessel 1 and branch lines 10 which in turn communicate with liquid near the bottom of vessel 1. Pumping means 9 in line 8 is provided. In operation, warm vapors in the top of vessel 1 are conducted via line 8 and branch lines 10 by means of pumping means 9 into the cooler liquid near the bottom of vessel 1. Contact of the vapors thereby dispersed in the cooler liquid results in cooling and partial condensation of vapors, thus reducing pressure in the tank, as will be understood. This contacting can be effected by employing a small continuous flow of vapors throughout warm periods or by employing somewhat larger intermittent flows throughout the same warm period. The rate of continuous pumping, or the length of time and/or frequency of intermittent pumping periods can be controlled by hand, or automatically in response to pressure variation within said vessel, as will be readily understood.

During the cool part of the night, circulation of liquid or vapors, according to the processes described in each of Figures 1, 2, 3, 4, and 5, is usually continued either intermittently or on a continuous basis in order to prevent too low a vacuum from being formed in the vessel due to cooling of vapors in the vapor space. In the case of a low pressure tank, having a breathing valve to allow air to come in, influx of air is eliminated or minimized when operating according to this aspect of the invention. In an ordinary storage tank which does not have the circulation means of the invention, the temperature of the vapors will drop very much more rapidly during the cool of the night than the temperature of the liquid because of the much greater mass of the liquid than of the vapor in relation to the surface areas of the vessel involved. Rapid cooling of vapor causes a decrease in vapor pressure in the vessel since equilibrium is not reached. During the night when the outside temperature is low, the vapors on the inside of the tank are cooled and some condensation occurs. When condensed vapor settles on the walls or the surface of the liquid, the surface of the liquid is cooled somewhat and this cool liquid has a lower vapor pressure. The settling and diffusion of the liquid is slow, since the liquid which condenses out of the vapor space usually has a relatively low specific gravity. Thus, this low specific gravity liquid, settling on the surface of the liquid, does not have a very great tendency to settle into the bottom of the liquid pool because this condensed liquid is lighter than the other liquid, and therefore time is required for this light liquid to diffuse into the other liquid. During the cool part of the night, the liquid along the outside of the vessel will be cooled by heat transfer and this results in the cooler liquid near the periphery or surface of the tank sinking to the bottom of the tank, and thereby somewhat increases heat transfer due to the resulting circulation of the liquid. However, this circulation of the liquid is very slow, the heat transfer rate is not greatly increased, and the average temperature of the liquid will not be appreciably lower. Thus, on cool nights it is seen that the vapor pressure is rapidly lowered to an undesirably low value, as before mentioned, while at the same time the heat transfer rate, or rate of cooling, of the liquid is not as high as desirable. Thus, according to the present invention, the liquid will be circulated into the vapor space of the tank at night when the outside temperatures are low. This has a tendency to cool the liquid by increasing the heat transfer rate between the metal wall and the liquid being circulated, and also by direct heat transfer between the cooler vapor and the liquid. According to the present invention, as shown in Figure 5, the vapor is circulated into the liquid, and this has the same effects, increasing the circulation of the liquid at the liquid metal interface and also, of course, increasing the heat transfer between the liquid and vapor. During the day time circulation and contact between vapors and liquid cool the vapors so that the temperature will not become abnormally high and the vapor pressure abnormally high, while during periods where the ambient temperature is relatively low, circulation is effected in order to keep the vapors warm enough to prevent an undesirably low pressure in the vapor space and in order more rapidly to cool the liquid. In other words, according to this aspect of the invention, the liquid is cooled at night and warmed in the day time, and the vapor pressure in the tank is thereby maintained at a more nearly constant value. According to the invention, circulation at night and in the day time can be effected either continuously or intermittently at rates, or during periods, necessary to maintain the vapor pressure below a maximum predetermined value during the warm days and to maintain the vapor pressure within the tank above a predetermined minimum value during cool nights.

One skilled in this art in possession of this disclosure and having read the same to understand its basic concepts will be able to effect variation and modification in the specific embodiments described herein by way of example, and also will be able to construct still other specific embodiments based upon the said concepts.

In a specific example of a system operated according to Figure 1, the stored liquid is 26 weight percent aqua ammonia and the vessel is a metal uninsulated cone roof tank 67'-6" in diameter and 25 feet high at the side. It was assumed that the liquid level varies between liquid full (i. e. filled up to the beginning of the cone roof) and ¼ of this level.

Case I was calculated at the latter level and case II at liquid full.

In each case it was assumed that the temperature of the cool liquid in the bottom of the tank was 89° F. at the beginning of operations, that the ambient temperature was 100° F. and the sun was shining.

In case II, when the tank is liquid full, the major portion of heat transmitted to the vessel from the sun will be absorbed by the liquid, resulting in a small temperature rise in the liquid and less heat absorption by the vapor above the liquid. Thus, the metal temperature of the vapor portion of the tank will rise to approximately 140° F.; while the metal portion in contact with the liquid will approach the temperature of the main body of cool liquid (approximately 89° F.). For this case a heat load of 469,000 B. t. u./hr. was calculated with overall heat transfer coefficients (U) of 2.06 and 1.62 B. t. u./hr.—F²—° F., for the vapor and liquid side, respectively. When employing sprays such that the average diameter of the sprayed particles is 800 mu, it was determined that the area in FT² per gallon of circulating liquid (sprayed particles) is approximately 305.

With tank liquid full and a calculated heat load of 469,500 B. t. u./hr., an aqua ammonia circulation rate of 100 G. P. M. will raise the circulated liquid 10° F. (from 89 to 99° F.) at this rate of increase, 6.7 hours is required before the pressure on the tank would increase 1" of $H_2O$. The relief valves on this tank are set at 2½" $H_2O$.

In case I, when the storage tank is ¼ full, the heat load will be 586,300 B. t. u./hr. and an aqua ammonia circulation rate of 140 G. P. M. will yield a Δ T of 7.4° F. (from 89 to 96.4° F.) for the circulated liquid. Based on this rate of circulation, the pressure on the tank will rise 2½" $H_2O$ in 3.3 hours.

It will be seen from the above examples that operation at liquid levels between case I and case II the heat load will be intermediate between the heat load in these two cases. The foregoing calculations show that, under the conditions assumed, operation continuously at a circulation rate of 100 G. P. M. would maintain the pressure of the tank below the predetermined maximum of just below 2½" $H_2O$ in a normal day. Late in the day when the heat input from the sun's rays and ambient temperatures decline, the pressure in the tank stops rising and begins to fall, and the circulation rate is usually decreased, by hand or automatically in response to this change in the pressure condition.

In the case of operation when the tank is ¼ liquid full under the conditions assumed, it will be seen that venting of vapors will not be prevented at the 140 G. P. M. rate of circulation after 3.3 hours, but will have been greatly minimized. Somewhat higher circulation rates will further minimize or even eliminate venting, depending upon how long these high rates of heat input continue during a given day.

As will be evident to those skilled in the art, various modifications of this invention can be made or followed in the light of the foregoing disclosure and discussion without departing from the spirit or scope of the disclosure or from the scope of the claims.

I claim:

1. A method for controlling the maximum pressure in a storage vessel containing liquid and vapors, which liquid is cooler near the bottom than on its surface, which comprises contacting such vapors with a portion of said cooler liquid and introducing directly to the surface of said liquid another portion of said cooler liquid, thereby cooling said vapors and cooling the surface of said liquid, thus reducing the pressure, the amount of said cooling being dependent upon the pressure in the vessel and being effective to maintain said pressure below a predetermined value.

2. The method of claim 1 wherein the said contacting of such vapors is effected by dispersing a portion of said cooler liquid into the vapor space of said vessel.

3. The method of claim 1 wherein the said another portion of said cooler liquid is further cooled by indirect heat exchange before contacting it with said surface of said liquid in said vessel.

4. The method of claim 3 wherein the said portion of said cooler liquid is further cooled by indirect heat exchange before contacting it with said vapors.

5. The method of claim 1 wherein said liquid is aqua ammonia.

6. The method of claim 1 wherein said liquid is crude oil.

7. The method of claim 1 wherein said liquid is a refined petroleum product.

References Cited in the file of this patent

UNITED STATES PATENTS

| | | |
|---|---|---|
| 884,610 | Rateau | Apr. 14, 1908 |
| 1,652,898 | Kramer | Dec. 13, 1927 |
| 2,059,942 | Gibson | Nov. 3, 1936 |
| 2,229,874 | Schwartz et al. | Jan. 28, 1941 |
| 2,229,875 | Schwartz et al. | Jan. 28, 1941 |
| 2,535,364 | Lee | Dec. 26, 1950 |
| 2,568,891 | Kals | Sept. 25, 1951 |
| 2,682,154 | Wilkinson | June 29, 1954 |
| 2,682,752 | Branson | July 6, 1954 |
| 2,693,247 | Olstad et al. | Nov. 2, 1954 |

FOREIGN PATENTS

| | | |
|---|---|---|
| 954,926 | France | June 20, 1949 |